United States Patent
Brooks et al.

(10) Patent No.: US 10,795,960 B2
(45) Date of Patent: *Oct. 6, 2020

(54) MANAGING BOOKMARKS WITHIN A COLLABORATIVE APPLICATION

(71) Applicant: International Business Machines Corporation, Armonk, NY (US)

(72) Inventors: David A. Brooks, Providence, RI (US); Jonathan D. Feinberg, Lincoln, MA (US); David R. Millen, Boxford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 887 days.

This patent is subject to a terminal disclaimer.

(21) Appl. No.: 15/294,711

(22) Filed: Oct. 15, 2016

(65) Prior Publication Data

US 2017/0032049 A1     Feb. 2, 2017

Related U.S. Application Data

(63) Continuation of application No. 14/632,216, filed on Feb. 26, 2015, now Pat. No. 9,471,699, which is a
(Continued)

(51) Int. Cl.
*H04J 99/00*     (2009.01)
*G06F 16/955*    (2019.01)
(Continued)

(52) U.S. Cl.
CPC .......... *G06F 16/9562* (2019.01); *G06F 16/13* (2019.01); *G06F 16/9535* (2019.01);
(Continued)

(58) Field of Classification Search
CPC .. G06F 16/9562; G06F 16/13; G06F 16/9653; H04L 61/1552; H04L 67/02
See application file for complete search history.

(56) References Cited

U.S. PATENT DOCUMENTS

| 5,848,410 A | 12/1998 | Walls et al. |
| 6,032,162 A * | 2/2000 | Burke ................. G06F 16/9562 |
| | | 715/207 |

(Continued)

FOREIGN PATENT DOCUMENTS

| JP | 11259496 | 9/1999 |
| JP | 2000331007 A | 11/2000 |

(Continued)

OTHER PUBLICATIONS

"Microsoft SharePointService 1.0," <http://www.topshareware.com/Add2SPS-for-Microsoft-SharePoint-Service-download-19060.htm, Dec. 23, 2004, 2 Pg.

(Continued)

*Primary Examiner* — Abdelnabi O Musa
(74) *Attorney, Agent, or Firm* — Cuenot, Forsythe & Kim, LLC

(57) ABSTRACT

A computer-implemented method of managing bookmarks within a collaborative application can include receiving a user input specifying a universal resource locator (URL) to be bookmarked and determining whether a bookmark record including the URL exists. Responsive to determining that a bookmark record including the URL does not exist, an address and a network type for the URL can be determined. A bookmark record including the URL and the network type can be stored.

20 Claims, 2 Drawing Sheets

Related U.S. Application Data continuation of application No. 11/964,025, filed on Dec. 25, 2007, now Pat. No. 8,984,044.

(51) Int. Cl.
  *G06F 16/13* (2019.01)
  *G06F 16/9535* (2019.01)
  *H04L 29/12* (2006.01)
  *H04L 29/08* (2006.01)

(52) U.S. Cl.
  CPC ...... *G06F 16/9566* (2019.01); *H04L 61/1552* (2013.01); *H04L 67/02* (2013.01)

(56) References Cited

U.S. PATENT DOCUMENTS

| | | | |
|---|---|---|---|
| 6,275,862 B1* | 8/2001 | Sharma | G06F 16/9562 709/245 |
| 6,725,227 B1 | 4/2004 | Li | |
| 7,031,961 B2 | 4/2006 | Pitkow et al. | |
| 7,403,801 B2 | 7/2008 | Ishigaki | |
| 8,984,044 B2 | 3/2015 | Brooks et al. | |
| 9,471,699 B2 | 10/2016 | Brooks et al. | |
| 2002/0099784 A1* | 7/2002 | Tran | G06F 16/9562 709/212 |
| 2002/0147742 A1* | 10/2002 | Schroeder | G06F 16/9562 715/205 |
| 2003/0046290 A1 | 3/2003 | Yamada | |
| 2003/0074415 A1 | 4/2003 | Bates et al. | |
| 2004/0205499 A1 | 10/2004 | Gupta | |
| 2004/0205501 A1 | 10/2004 | Gupta | |
| 2006/0212445 A1 | 9/2006 | Rydahl et al. | |
| 2006/0253463 A1 | 11/2006 | Wu et al. | |
| 2008/0040313 A1 | 2/2008 | Schacter | |
| 2009/0164634 A1 | 6/2009 | Brooks et al. | |
| 2015/0169781 A1 | 6/2015 | Brooks et al. | |

FOREIGN PATENT DOCUMENTS

| | | |
|---|---|---|
| JP | 2003067328 A | 3/2003 |
| KR | 2000331007 A | 11/2000 |
| KR | 20060025465 A | 3/2006 |
| WO | 0048057 A2 | 8/2000 |
| WO | 0067159 A2 | 11/2000 |
| WO | 2009082106 A2 | 7/2009 |

OTHER PUBLICATIONS

Gries, T. et al., "Wiki-Based Intranet and Internet Search Assistant and Bookmark Sharing Tool Using Auto-Type Detection and Approximate and Regular Expression Patter Shortcuts WIBISA," Research Disclosure, Mason Publications, Database No. 488004, Nov. 10, 2004.
U.S. Appl. No. 11/964,025, Non-Final OfficeAction, dated May 12, 2010, 9 pg.
U.S. Appl. No. 11/964,025, Final OfficeAction, dated Nov. 26, 2010, 20 pg.
U.S. Appl. No. 11/964,025, Appeal Brief, Apr. 6, 2011, 32 pg.
U.S. Appl. No. 11/964,025, Examiner's Answer, dated Jul. 8, 2011, 17 pg.
U.S. Appl. No. 11/964,025, Reply Brief, Sep. 8, 2011, 13 pg.
U.S. Appl. No. 11/964,025, Decision on Appeal, May 28, 2014, 8 pg.
U.S. Appl. No. 11/964,025, Notice of Allowance, dated Aug. 11, 2014 , 5 pg.
U.S. Appl. No. 11/964,025, Request for Continued Examination, dated Sep. 16, 2014 , 3 pg.
U.S. Appl. No. 11/964,025, Notice of Allowance, dated Nov. 5, 2014 , 5 pg.
WIPO International Appln. PCT/KR2008/007349, ISR, dated Jul. 15, 2009, 2 Pg.
WIPO International Appln. Int'l. Preliminary Report on Patentability, dated Jun. 29, 2009, 5 pg.
WIPO International Appln. Int'l. Search Report, dated Jul. 15, 2009, 5 pg.
U.S. Appl. No. 14/632,216, Non-Final Office Action, dated Jan. 12, 2016, 14 pg.
U.S. Appl. No. 14/632,216, Notice of Allowance, dated Jun. 30, 2016, 9 pg.

* cited by examiner

MANAGING BOOKMARKS WITHIN A
COLLABORATIVE APPLICATION

FIELD OF THE INVENTION

The embodiments of the present invention relate to collaborative applications and, more particularly, to collaborative applications that facilitate bookmarking.

BACKGROUND OF THE INVENTION

Searching has been the primary mechanism for finding content within networked computing environments. Available search technologies are suited to locating free text content despite the free text not being formally organized into a data structure for browsing. Search engines typically operate by gathering content using crawlers that are configured by an administrator to function in a particular manner. Based upon administratively defined rules, the crawlers collect information about Web pages or sites, thereby allowing users to search the crawled content.

If one wishes to separate one collection of data from another, rather than lumping all data together into a single collection, the decision to do so must be made by an administrator. The search engine can be configured with appropriate administrative rules for creating two, or more, collections of data. Each collection can be processed, e.g., crawled, independently. Only after that manual decision and configuration process is complete can users direct queries to a particular collection.

Collaborative, or social, bookmarking has emerged as a way for Internet users to store, organize, share, and search bookmarks of for Web pages. In a social bookmarking system, each user may save a universal resource locator (URL) to a Web page that the individual wishes to remember or share with others. Typically, the bookmarks of one user are available to other users of the collaborative bookmarking system or are publicly available. In some cases, bookmarks may be designated as private and, therefore, be available only to the user that created the bookmark.

Some collaborative bookmarking applications promote the use of tags for organizing bookmarks. Tagging allows users to view a subset of bookmarks associated with a chosen tag from a larger collection of bookmarks. Within collaborative environments, collaborative tagging can be used to organize, categorize, and navigate the collection of bookmarks. In general, "collaborative tagging," refers to a process by which more than one user may associate tags with various bookmarks stored within the collaborative bookmarking application.

With respect to both tagging and collaborative tagging, users associate keywords, known as "tags," with various objects or references to objects, e.g., data. Each tag can be user-defined and is usually descriptive of some aspect of the object(s) to which the tag is associated. A tag can be viewed as a form of metadata in that each tag provides information about the data to which the tag is associated.

Unlike conventional search collections, tagged collections of bookmarks collected by end users are not organized into a logical set of sub-collections. For example, unlike typical taxonomies used for large digital libraries, the tags used to describe content in a collaborative tagging system are not defined by a rigid classification system. Rather, users freely create tags and freely associate those tags with objects or references to objects, depending upon the particular type of collaborative tagging system. This results in a "flatter" structure for classifying data. By comparison, a taxonomy is hierarchical in nature. Navigating from one item of information to another within a taxonomy requires traversal of the hierarchy.

BRIEF SUMMARY OF THE INVENTION

The embodiments of the present invention relate to collaborative applications and, more particularly, to collaborative applications that facilitate bookmarking. One embodiment of the present invention can include a computer-implemented method of managing bookmarks within a collaborative application. The method can include receiving a user input specifying a universal resource locator (URL) to be bookmarked and determining whether a bookmark record including the URL exists. Responsive to determining that a bookmark record including the URL does not exist, an address and a network type for the URL can be determined. A bookmark record including the URL and the network type can be stored.

Another embodiment of the present invention can include a computer-implemented method of managing bookmarks within a collaborative application including storing a plurality of bookmark records, wherein each bookmark record includes a URL and a network type, and receiving a query specifying a network type search parameter. The method can include locating each bookmark record that matches the query, wherein each located bookmark record includes a network type that conforms with the network type search parameter, and outputting at least a portion of a bookmark record that matches the query.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL
VIEWS OF THE DRAWINGS

Figure 1:
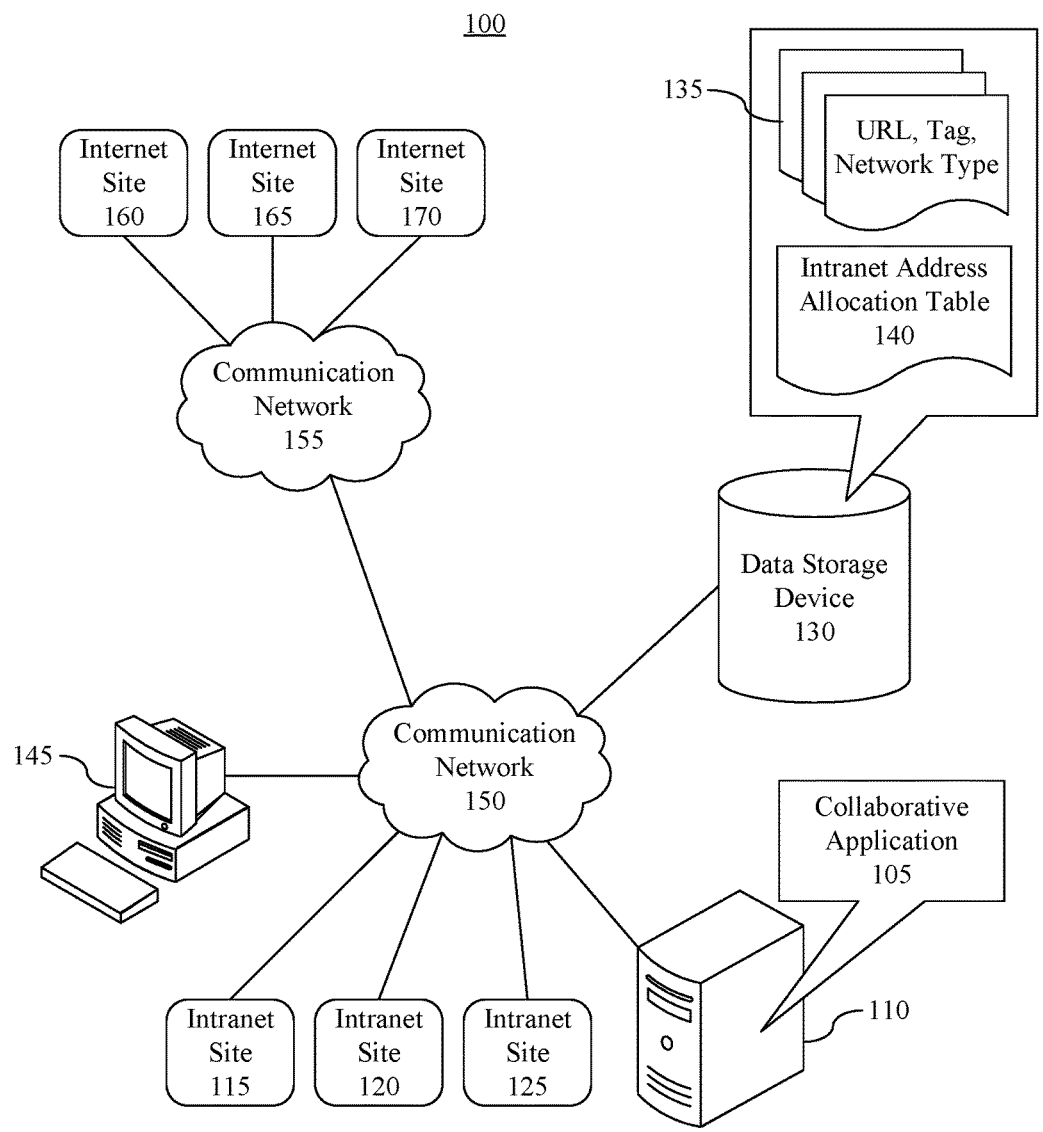
FIG. 1 is a block diagram illustrating a system for managing bookmarks in accordance with one embodiment of the present invention.

DETAILED DESCRIPTION OF THE
INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters. Examples of data processing systems can include desktop computer systems, laptop computer systems, servers, personal digital assistants, mobile communication devices, e.g., mobile phones, or other information appliances.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to collaborative applications and, more particularly, to collaborative bookmarking. In accordance with the embodiments disclosed herein, a collaborative application can automatically detect information that is to be stored as part of two or more different collections. The information, e.g., bookmarks, can be stored along with an indicator of the particular collection to which the data belongs. More particularly, in the context of bookmarking a universal resource locator (URL) within a collaborative application, a network type for each URL can be detected, stored, and used as a mechanism for separating and/or organizing bookmarks within a collection of bookmarks.

As URL is identified for inclusion within the collaborative application, the collaborative application can determine a network type for that URL. The network type attribute can be stored with the URL as part of a bookmark record. Accordingly, in subsequent interactions with the collaborative application, users may query or otherwise utilize the network type to manage, organize, or locate bookmark records within the collaborative application.

A "site," as used herein, can refer to any network accessible resource that is accessed by a URL or an address. For example, a "site" can refer to any Web site, markup language page or file, electronic document, or the like, whether stored on a private network, e.g., an intranet, or on a public network, e.g., the Internet. A "URL," as used herein, can refer to the textual address used to access a network accessible site. A URL can refer to the human readable form of a network address that mimics the folder or directory structure of a computer file system. The URL indicates the particular communication protocol to be used to access a given resource as well as the domain. Further directory structures existing beneath the domain also may be specified for increasing detail.

By comparison, the address, or Internet Protocol (IP) address, refers to the numerical address to which the URL is translated in order to lookup or access a particular site when referenced by its URL. The IP address is an identifier for a computer or device on a TCP/IP network. Networks using the TCP/IP protocol route messages based on the IP address of the destination. The format of an IP address is a 32-bit numeric address written as four numbers separated by periods.

FIG. 1 is a block diagram illustrating a system 100 for managing bookmarks in accordance with one embodiment of the present invention. As shown, the system 100 can include a collaborative application 105 executing within a data processing system 110, a data storage device 130, a plurality of intranet sites 115, 120, and 125, as well as one or more user data processing systems 145. Each of the aforementioned components may be communicatively linked via a communication network 150.

The communication network 150 can be an intranet. The communication network 150 may be a private network that can include or be implemented as, without limitation, a WAN, a LAN, the Public Switched Telephone Network (PSTN), the Web, the Internet, and one or more intranets. The communication network 150 further can be implemented as or include one or more wireless networks, whether short or long range, including mobile communication networks. It should be appreciated that when public networks are included within communication network 150, various security protections can be implemented, e.g., virtual private networking, encryption, or the like such that the communication network 150 still may be considered private or available only to a limited and/or defined set of users, e.g., where access is restricted.

The collaborative application 105 can be a collaborative tagging application, a collaborative bookmarking application, or some combination of the two. The data storage device 130 can include application data for the collaborative application 105. The data stored within the data storage device 130 can be stored in the form of a database, one or more tables, or in any other suitable data structure(s). In one embodiment, the data storage device 130 can be included within the data processing system 110. In another embodiment, and as shown, the data storage device 130 can be physically separate from, but communicatively linked with, the data processing system 110 via communication network 150. Further, it should be appreciated that the data storage device 130 can be implemented as a plurality of interconnected data storage devices.

In any case, the data storage device 130 can include, or store, a plurality of bookmark records 135. Each bookmark record 135 can include a URL for a site that has been bookmarked by a user of the collaborative application 105, optionally one or more tags, and a network type. The network type can be determined automatically by the collaborative application 105 as will be described herein in greater detail.

Also included within the data storage device 130 can be an intranet address allocation table 140. The intranet address allocation table 140 can comprise a list of addresses, specified by an administrator, that are part of the intranet of an organization. For example, the intranet address allocation table 140 can specify each IP address or various ranges of IP addresses that are part of the intranet of a company or other organization. As such, the various sites of an intranet corresponding to the enumerated addresses within the intranet address allocation table 140 are not publicly available or are restricted in some way. Each site having an address in the intranet address allocation table 140 can be available only to designated users having proper credentials or access privileges for viewing such sites.

In one embodiment, the intranet address allocation table 140 can be specified as one or more Extensible Markup Language (XML) files, e.g., as a set of XML files that may be configured via an administrative console. One of the configuration settings can control or configure the intranet address allocation table 140. An exemplary intranet address allocation table is provided below:

```
<!--
    Intranet IP Range (inclusive)
-->
<privateIntranetAllocationTable>
    <ipRange from="9.0.0.0" to="9.247.255.255" />
    <ipRange from="10.0.0.0" to="10.0.255.255" />
    <ipRange from="129.39.0.0" to="129.39.255.255" />
    <ipRange from="130.103.0.0" to="130.103.255.255" />
    <ipRange from="149.131.0.0" to="149.131.255.255" />
    <ipRange from="158.98.0.0" to="158.98.255.255" />
</privateIntranetAllocationTable>
```

From the exemplary intranet address allocation table above, it can be seen that various ranges of IP addresses can be specified as intranet address. It should be appreciated that storing the intranet address allocation table 140 as an XML file is but one possible embodiment. The intranet address allocation table 140 can be specified in any of a variety of different data structures and/or formats.

The data processing system 145 may be a user-accessible computing system. Though one is illustrated, it should be appreciated that many more user-accessible computing systems may be included within the system 100. Each of the intranet sites 115-125 may be hosted within a data processing system, e.g., a server, and be available only to users that have been given access to such intranet sites 115-125. For example, intranet sites 115-125 can be available only to users allowed to access communication network 150 or some subset of such users.

Communication network 150 can be communicatively linked with a communication network 155. Communication network 155 can be implemented as, or include, without limitation, a WAN, a LAN, the Public Switched Telephone Network (PSTN), the Web, and the Internet. Communication network 155 further can be implemented as or include one or more wireless networks, whether short or long range, including mobile communication networks. Communication network 155 and resources within that network, in contrast to communication network 150, can be publicly accessible, e.g., accessed by users without restriction. Through communication network 155, users, including users working through data processing systems linked with communication network 150, e.g., data processing system 145, may access Internet sites 160, 165, and 170. Each such Internet site may be hosted by a suitable data processing system.

In operation, a user working through data processing system 145 can view an intranet site, e.g., intranet site 115. After determining that the intranet site is useful, the user may provide an input to the collaborative application 105 indicating that the intranet site 115 should be bookmarked. Responsive to that request, the collaborative application 105 can perform an analysis to determine whether the intranet site has been bookmarked already, e.g., whether a bookmark record 135 exists within the data storage device 130 for intranet site 115.

If not, the collaborative application 105 can create a bookmark record 135. The bookmark record 135 can specify the URL of intranet site 115 as well as any tags that the user may have specified. In addition, the collaborative application 105 can determine the address of intranet site 115 and compare that address with the intranet address allocation table 140. Based upon whether the address of intranet site 115 is enumerated within the intranet address allocation table 140, a network type can be stored as part of the bookmark record 135 for intranet site 115. The network type can indicate whether intranet site 115 is within the intranet or is part of the Internet. In this case, the network type can be "intranet."

In another example, in the case where the user bookmarks Internet site 160, the collaborative application 105 can identify the address of Internet site 160 and compare that address with the intranet address allocation table 140. After determining that Internet site 160 is not an enumerated intranet site, the bookmark record 135 created for Internet site 160 can indicate a network type of "Internet."

Figure 2:
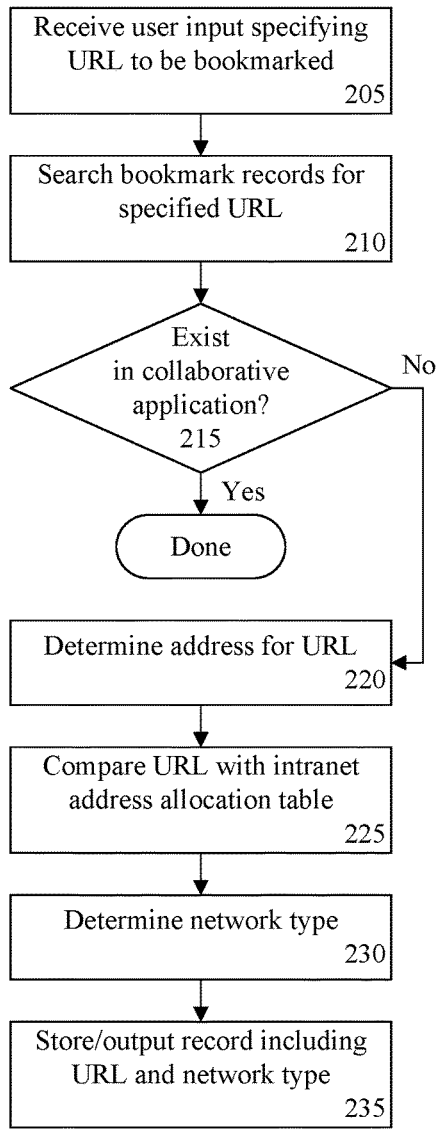
FIG. 2 is a first flow chart illustrating a method of managing bookmarks within a collaborative application in accordance with another embodiment of the present invention.

FIG. 2 is a flow chart illustrating a method 200 of managing bookmarks within a collaborative application in accordance with another embodiment of the present invention. The method 200 can be implemented using the system as described with reference to FIG. 1. The method 200 can begin in a state where a user of the collaborative application, e.g., a member of an organization and one with access to restricted or private intranet sites, is viewing one or more different sites, whether intranet sites or Internet sites.

Accordingly, in step 205, the collaborative application can receive a user input specifying a URL to be bookmarked. In step 210, the collaborative application can search existing bookmark records to determine whether the specified URL exists in the collaborative application or has already been bookmarked, e.g., is specified within a bookmark record. In step 215, if user input URL exists in the collaborative application, the method can end. It should be appreciated, however, that the user still may add one or more tags as desired. If the URL does not exist in the collaborative application, the method can proceed to step 220.

In step 220, responsive to determining that the URL does not exist in the collaborative application, the address, e.g., the IP address for the URL, can be determined. In step 225, the address of the URL can be compared with the intranet address allocation table to determine whether the address of the URL is specified by the intranet address allocation table as an intranet address, e.g., a private or restricted address. In step 230, the collaborative application can determine the network type of the address based upon the comparison from step 225. When the address for the URL is an address that is included or specified in the intranet address allocation table, the network type for the URL can be "intranet." When the address is not an enumerated address in the intranet address allocation table, the network type of the URL can be specified as "Internet."

In step 235, the collaborative application can output a bookmark record for the URL. The bookmark record can include the URL, any tags that the user may have specified for the URL, as well as the network type determined in step 230. As used herein, "output" or "outputting" can include, but is not limited to, storing data in memory, writing to a file, writing to a user display or other output device, playing audible notifications, sending or transmitting to another system, exporting, or the like.

Figure 3:
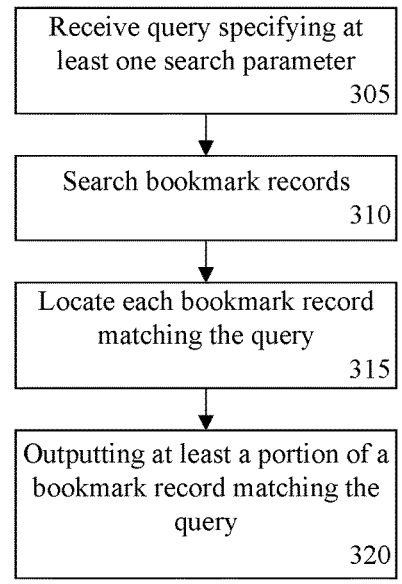
FIG. 3 is a second flow chart illustrating a method of managing bookmarks within a collaborative application in accordance with another embodiment of the present invention.

FIG. 3 is a flow chart illustrating a method 300 of managing bookmarks within a collaborative application in accordance with another embodiment of the present invention. The method 300 can be implemented using the system described with reference to FIG. 1. The method 300 can begin in a state where the system includes, or has stored, a plurality of bookmark records, each specifying a URL, any tags that have been associated with that URL, as well as a network type. The collection of bookmark records may be searched by users of the collaborative application.

In step 305, a query can be received from a user of the collaborative application. The query can specify one or more search parameters. The search parameters can specify, for example, some part or all of a URL to be located, some part or all of a tag or tags, as well as a network type search parameter. Thus, a user may search for any URLs that have been tagged with the tag "IBM" and for which the network type is "Internet" or "intranet" as may be desired by the user that submits the query. The network type search parameter further may be specified as "both," "do not care," or "all" which may return bookmark records matching the search parameters that may be intranet sites or Internet sites. That is, the query results would include both intranet sites and Internet sites.

In step 310, the collaborative application can search the bookmark records for any bookmark records that match the search parameter(s) of the query received in step 305. In step 315, any matching bookmark records can be located or otherwise identified. In step 320, one or more of the bookmark records, or any portion thereof, identified or located in step 315 can be output. For example, the entire bookmark record, or records as the case may be, may be output, the URLs only may be output, or the like.

When bookmark records, or bookmarks, e.g., URLs, are visually represented, URLs having a network type of intranet can be visually distinguished from URLs having a network type of Internet. For example, the identifier or graphic typically associated with the URL may be indicative of the network type of the URL. One type of icon may be displayed for intranet sites while another icon can be displayed for Internet sites. Different colors of text or fonts also may be used to distinguish or indicate URLs according to network type.

The embodiments disclosed herein facilitate the automatic detection of intranet and Internet content when stored within a shared repository, e.g., a folksonomy. Improved navigation and information discovery can be provided via automatic identification of network types for URLs.

The flowchart(s) and block diagram(s) in the figures illustrate the architecture, functionality, and operation of possible implementations of systems, methods and computer program products according to various embodiments of the present invention. In this regard, each block in the flowchart (s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of managing bookmarks within a collaborative application, comprising:
   receiving a user input specifying a universal resource locator (URL) to be bookmarked in the collaborative application;
   determining whether a bookmark record including the URL exists; storing, within a storage hardware device and responsive to determining that the bookmark record including the URL does not exist in the collaborative application, a bookmark record comprising the URL and a network type indication of the URL as part of the bookmark record.

2. The method of claim 1, further comprising determining whether an address of the URL is specified within an intranet address allocation table.

3. The method of claim 2, wherein the network type is intranet upon the URL being specified in the intranet address allocation table.

4. The method of claim 2, wherein the network type is internet upon the URL not being specified in the intranet address allocation table.

5. The method of claim 1, further comprising outputting the URL and an indication of the network type.

6. The method of claim 1, further comprising receiving a query specifying a network type search parameter.

7. The method of claim 6, further comprising locating, within the storage hardware device, and outputting at least a portion of each bookmark record having a network type matching the network type search parameter specified within the query.

8. A computer hardware system configured to manage bookmarks within a collaborative application, comprising:
   a storage hardware device; and
   at least one hardware processor, wherein the at least one hardware processor is configured to initiate and/or perform:
   receiving a user input specifying a universal resource locator (URL) to be bookmarked in the collaborative application;
   determining whether a bookmark record including the URL exists;
   storing, within the storage hardware device and responsive to determining that the bookmark record including the URL does not exist in the collaborative application, a bookmark record comprising the URL and a network type indication of the URL as part of the bookmark record.

9. The system of claim 8, wherein the at least one hardware processor is further configured to initiate and/or perform determining whether an address of the URL is specified within an intranet address allocation table.

10. The system of claim 9, wherein the network type is intranet upon the URL being specified in the intranet address allocation table.

11. The system of claim 9, wherein the network type is internet upon the URL not being specified in the intranet address allocation table.

12. The system of claim 8, wherein the at least one hardware processor is further configured to initiate and/or perform outputting the URL and an indication of the network type.

13. The system of claim 8, wherein the at least one hardware processor is further configured to initiate and/or perform receiving a query specifying a network type search parameter.

14. The system of claim 13, wherein the at least one hardware processor is further configured to initiate, and/or perform locating, within the storage hardware device, and outputting at least a portion of each bookmark record having a network type matching the network type search parameter specified within the query.

15. A computer program product for managing bookmarks within a collaborative application, comprising:
   a storage hardware device having stored therein computer-usable program code, which when executed by a computer hardware system, causes the computer hardware system to perform:
   receiving a user input specifying a universal resource locator (URL) to be bookmarked in the collaborative application;
   determining whether a bookmark record including the URL exists;
   storing, within the storage hardware device and responsive to determining that the bookmark record including the URL does not exist in the collaborative application, a bookmark record comprising the URL and a network type indication of the URL as part of the bookmark record.

16. The computer program product of claim 15, wherein the computer-usable program code further causes the computer hardware system to perform determining whether an address of the URL is specified within an intranet address allocation table.

17. The computer program product of claim 16, wherein the network type is intranet upon the URL being specified in the intranet address allocation table.

18. The computer program product of claim 16, wherein the network type is internet upon the URL not being specified in the intranet address allocation table.

19. The computer program product of claim 15, wherein the computer-usable program code further causes the computer hardware system to perform outputting the URL and an indication of the network type.

20. The computer program product of claim 15, wherein the computer-usable program code further causes the computer hardware system to perform receiving a query specifying a network type search parameter.

\* \* \* \* \*